(12) United States Patent  
Moehlmann et al.

(10) Patent No.: US 7,975,566 B2  
(45) Date of Patent: Jul. 12, 2011

(54) HYDRAULIC CONTROL APPARATUS FOR AN AUTOMATIC DUAL CLUTCH TRANSMISSION

(75) Inventors: Reinhard Moehlmann, Cologne (DE); Martin Leibbrandt, Bedburg (DE)

(73) Assignee: Getrag Ford Transmissions GmbH, Cologne (DE)

( * ) Notice: Subject to any disclaimer, the term of this patent is extended or adjusted under 35 U.S.C. 154(b) by 841 days.

(21) Appl. No.: 12/018,356

(22) Filed: Jan. 23, 2008

(65) Prior Publication Data

US 2008/0176711 A1    Jul. 24, 2008

(30) Foreign Application Priority Data

Jan. 23, 2007  (EP) ..................................... 07100993

(51) Int. Cl.  
*F16H 59/00*    (2006.01)
(52) U.S. Cl. ........................................................ 74/335
(58) Field of Classification Search .................... None  
See application file for complete search history.

(56) References Cited

U.S. PATENT DOCUMENTS 4,495,837 A * 1/1985 Morscheck ................... 477/124

FOREIGN PATENT DOCUMENTS

EP    1635091    3/2006

* cited by examiner

*Primary Examiner* — Dirk Wright  
(74) *Attorney, Agent, or Firm* — Schlee IP International, P.C.; Alexander R. Schlee

(57) ABSTRACT

A hydraulic control apparatus for an automatic dual clutch transmission, comprising a first clutch with a first partial transmission and a second clutch with a second partial transmission, as well as a shifting system for engaging/disengaging gears of the two partial transmissions, a control unit having a first pressure regulator and a second pressure regulator actuating the first and second clutches and actuating the shifting system, and a switching apparatus. The shifting apparatus comprises a first changeover valve and a second changeover valve. Both changeover valves can be shifted from a first to a second position for allowing a safe emergency running mode of a motor vehicle in case of any failure of the first or second pressure regulator.

10 Claims, 2 Drawing Sheets

HYDRAULIC CONTROL APPARATUS FOR AN AUTOMATIC DUAL CLUTCH TRANSMISSION

Priority from the European patent application 07100993.0 is claimed, the content of which is herewith incorporated entirely by reference.

BACKGROUND OF THE INVENTION

The invention relates to hydraulic control apparatus for an automatic dual clutch transmission and to a method for controlling said the transmission with the hydraulic control apparatus.

Dual clutch transmissions have been known for some time and are preferably applied in motor vehicles. Generally, a dual clutch transmission comprises two partial transmissions, each one of which having a separate clutch and a group of gears. For the reason of a significant mechanical complexity required for actuating the clutches as well as shifting gears in the two partial transmissions, dual clutch transmissions are usually designed as automatic transmissions, i.e. both actuating the clutches as well as shifting the gears is a done by means of servo drives that can for instance be designed as hydraulic shifting means that are controlled by a hydraulic control apparatus.

From EP 1 635 091 A1 the hydraulic control apparatus for an automatic dual clutch transmission is known comprising a first clutch with a first partial transmission and a second clutch with a second partial transmission as well as a shifting system for shifting into and out of gears in the two partial transmissions. The hydraulic control apparatus comprises a control unit predetermining at least one of the parameter's control pressure and controllable volume flow for activating the first and second clutches and for actuating the shifting system. Further, the control apparatus comprises a changeover means provided between the control unit and two clutches and/or the shifting system by means of which the control pressure and/or the controllable volume flow are directed to the clutches or the shifting system. The control unit comprises a first control valve and a second control valve, while the changeover means comprises a first changeover valve and a second changeover valve. In a first position $A_I$, the first changeover valve connects the first control valve with the first clutch and separates the first control valve from the shifting system. In position $B_I$, the first changeover valve connects the first control valve with the shifting system and separates the first control valve from the first clutch. Also the second changeover valve is capable of assuming two positions, wherein in a first position $A_{II}$ the second control valve is connected with the second clutch and the second control valve is separated from the shifting system. In a second position $B_{II}$, the second changeover valve provides a connection between the second control valve and the shifting system while it separates the second control valve from the second clutch. The control apparatus according to EP 1 635 091 A1 enables shifting of gears by means of only one of the two control valves, respectively.

For being able to actuate both clutches under emergency running conditions, EP 1 635 091 A1 suggests that in the position $B_I$ of the first changeover valve and in the position $B_{II}$ of the second changeover valve the first control valve is connected with the second clutch and the second control valve is connected with the first clutch. If for instance the first control valve fails, the first clutch can be controlled by the second control valve if the first and the second changeover valves are in positions $B_I$ and $B_{II}$, respectively. The second clutch can also be continuously operated by the second control valve, if said second control valve is shifted into the position $A_{II}$.

Under emergency running conditions, severe problems might occur if one of the control valves fails while in an open position. In that case, the failing control valve provides an undesired pressure rendering it difficult or impossible to open one of the clutches for disengaging one of the gears that is assigned to the respective partial transmission. Furthermore, the changeover valves for this solution require numerous input and output ports, making these changeover valves of complicated design and accordingly, requiring a lot of space.

SUMMARY OF THE INVENTION

It is an object of the invention to provide a hydraulic control apparatus for an automatic dual clutch transmission that is this simple, can be built with low costs, is compact and provides under the conditions that one of the control valves fail continue running the vehicle with as many gears as possible without any safety risk so that the motor vehicle comprising the dual clutch transmission can still be operated to drive in an emergency running mode.

This object is achieved by a control apparatus according to the invention. Further preferred embodiments are described in the following. Further, an inventive method for operating the control apparatus according to the invention is described in the following.

The control apparatus according to the invention has in particular the properties that in the second position ($B_I$) of the first changeover valve and in the second position ($B_{II}$) of the second changeover valve a connection is established between the second changeover valve and the first clutch, while the second clutch is substantially completely depressurized.

In case of a failure of one of the pressure regulators in an open position, the control apparatus according to the invention allows an emergency running mode without running into the danger of a switching position that might affect the dual clutch transmissions or the entire motor vehicle in which the dual clutch transmission is installed. The control apparatus according to the invention prioritizes the first clutch and at the same time renders the second clutch only to a limited extent operable or accepts that in an emergency running mode driving of a motor vehicle by operating of the second clutch is impossible. This prioritizing allows a reliable engagement and disengagement of the gears of the first partial transmission as well as the save opening and closing of the first clutch. How the control apparatus operates preferably in case of a failure of one of the control valves is explained in detail in the following.

According to a preferred embodiment, the first partial transmission comprises a first fort gear and the reverse gear. This secures that the motor vehicle can still be maneuvered and shunted in case of a failure of a pressure regulator. From a stationery state the motor vehicle can be moved both to the rear and to the front.

According to a particularly preferable embodiment a switching means is provided between the first changeover valve and the shifting system and between the second changeover valve and the switching system, which switching means ensures that the shifting system is subjected to either the pressure/volumetric flow from the first pressure regulator or the pressure/volumetric flow from the second pressure regulator. The switching means can separate the connection between the shifting system and the pressure regulator that (at this moment) is not provided for controlling the switching system or cannot control the switching system because of a failure. Controlling of the switching system is therefore not affected by an undesired interference of two pressure regulators, one of which might be defective.

Preferably, the switching means is designed as an alternating check valve. The check valve comprises a first and second inlet port as well as one outlet port, wherein the first inlet port is connected to the first pressure regulator and the second inlet port is connected to the second pressure regulator. The outlet port of this switching means is connected with the switching system. The changeover valve provides a connection between the outlet port and the inlet port, the latter being subjected to a higher pressure, wherein at the same time the connection between the outlet port and the inlet port is separated with low pressure.

According to a preferred embodiment the control apparatus comprises a group selector by means of which the control unit is connected either to a first group of actuators or servo drives belonging to the first partial transmission or to a second group of actuators or servo drives belonging to the second partial transmission. This group selector can comprise a valve that can preferably assume two positions, wherein in a first position, the controlled pressure/volume flow of the control unit is switched to the first group of actuators and in a second position, the controlled pressure/volume flow is switched to the second group of actuators. Simultaneously, in a first position of the valve of the group selector the connection between the control unit and the second group of actuators is separated. In analogy, in the second position, the first group of actuators is separated by the control unit.

The shifting sequence and the shifting logic can be varied as appropriate for the control apparatus according to the invention. In case of normal driving the respective changeover valve is shifted into its second position B ($B_I$ or $B_{II}$) when the shifting system is activated for engaging or disengaging gears. Other than that, the changeover valves assume their respective first position A ($A_I$, $A_{II}$) so that the first pressure regulator is connected to the first clutch and the second pressure regulator is connected to the second clutch.

In case of a failure of the first pressure regulator, according to the inventive method for controlling a dual clutch transmission comprising the control apparatus as described above, the first changeover valve is switched to its second position $B_I$ and the second changeover valve is switched to its second position $B_{II}$. This causes the second clutch to be depressurized so that it cannot transmit any torque. In the second positions $B_I$, $B_{II}$ of the two changeover valves the second pressure regulator is connected to the first clutch. This allows opening and closing of the first clutch in a controlled manner and therefore allows transmitting of torque with and without slip.

In case of a failure of the first pressure regulator the gears of a first partial transmission are engaged and disengaged by means of the second pressure regulator when the first pressure regulator fails in its closed position. In case of a failure of the first pressure regulator in its open position the pressure required for shifting is provided—passing through the open first pressure regulator—from a main pressure regulator of an oil source of the control apparatus. In this case, the first changeover valve assumes its second position $B_I$ by means of which a connection is provided between the first pressure regulator and the shifting system.

Before proceeding as described above, preferably a possibly engaged gear of the second partial transmission is disengaged. Also in this case the switching position of the control apparatus depends on whether the first pressure regulator has failed in its closed or in its open position. In its closed position of the failed first pressure regulator the disengagement of the respective gear is caused by the second pressure regulator, while in the open position the pressure for disengaging is directly provided by the main pressure regulator.

If the second pressure regulator fails, the second changeover valve is held in its first position $A_{II}$ or switched into said first position $A_{II}$. If no gear is engaged in the second partial transmission, the second partial transmission does not transmit any torque, regardless of whether the second clutch is closed, that being the case when the second pressure regulator fails in its open position; or whether the second clutch is open, that being the case when the second pressure regulator has failed in its open position.

If a gear in the second partial transmission is engaged, it is preferably first disengaged in case of a failure of the second pressure regulator prior to controlling of the first clutch and the shifting system as described above. In the open position of the failed second control valve the gear is disengaged by means of the main pressure regulator. For this purpose, the second changeover valve has to be brought into its second position $B_{II}$. If the second pressure regulator fails in its closed position, the gear is disengaged by means of the first pressure regulator by switching the first control valve into its second position $B_I$. If disengaging by means of the first pressure regulator caused by additional constrains in the control apparatus (coupling of the group selector and the first changeover valve by means of a mutual signal element) is impossible, the gear can remain engaged since because of the closed position of the failed second pressure regulator the second clutch is not subjected to any pressure and therefore open. However, it has to be observed that the speed of the motor vehicle is restricted to a speed that is acceptable to the engaged gear.

BRIEF DESCRIPTION OF THE DRAWINGS

Referring to the figures showing an embodiment of the invention, the invention is described in more detail in the following. In the drawings.

DETAILED DESCRIPTION OF THE DRAWINGS

Figure 1:
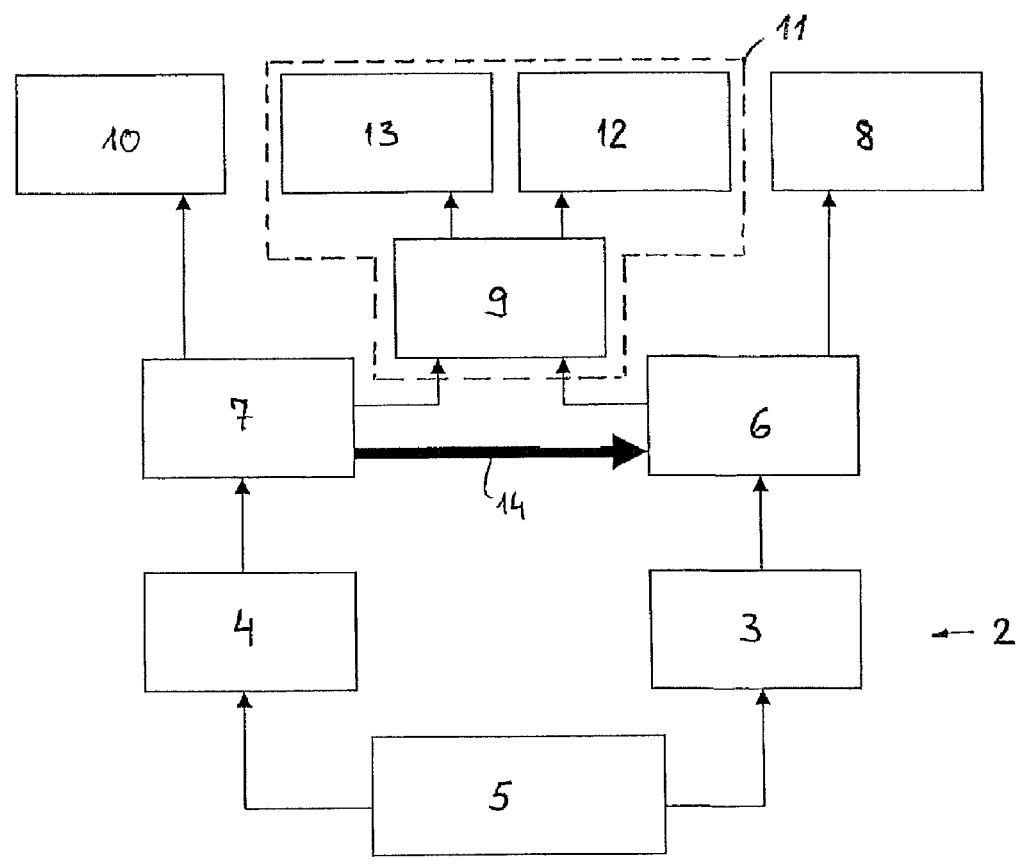
FIG. 1 shows an embodiment of the invention in a schematic manner.

FIG. 1 shows a schematic view of a hydraulic control apparatus according to the invention, generally denoted with reference numeral 1. The control apparatus 1 comprises a control unit 2 having a first control valve in the form of a first pressure regulator 3 and a second control valve in form of a second pressure regulator 4. At the input side both pressure regulators 3 and 4 are connected to an oil pressure source 5.

A first changeover valve 6 is connected to the first pressure regulator 3 and a second changeover valve 7 is connected to the second pressure regulator 4. By means of the first changeover valve 6 the first pressure regulator 3 can either be connected to the first clutch 8, or connected to a path or group selector 9. By means of the second changeover valve 7 the controlled pressure from the second pressure regulator 4 can either shift the group selector 9 or the second clutch 10.

By means of the control apparatus 1 a dual clutch transmission installed in a motor vehicle and having two separate clutches (first clutch 9 and second clutch 10) as well as a plurality of switching means and actuators can be controlled for shifting into and out of gears of the transmission. The dual clutch transmission comprises a first and a second partial transmission to which the first and the second clutch are dedicated, respectively. If a clutch cylinder of a clutch is pressurized, the clutch is closed, while otherwise kept open by a spring force. In the closed mode the clutch transmits a torque between the driving unit of a motor vehicle (for instance the combustion engine) and the respective partial transmission.

The group selector 9 is part of the shifting system 11, comprising a first group of actuators 12 and the second group of actuators 13. By means of the first group of actuators the gears of the first partial transmission can be engaged and disengaged, while by the group of second actuators 13 the gears of the second partial transmission can be engaged or disengaged. The group selector 9 does thereby direct the controlled pressure of the control unit to either the first group of actuators 12 or the second group of actuators 13. In addition, the shifting system 11 comprises further shifting valves that are, however, not shown here for actuating the respective actuators or their chambers.

The conspicuously highlighted arrow 14 in FIG. 1 should symbolize that the control apparatus 1 in a particular shifting position establishes a connection between the second changeover valve 7 and the first changeover valve 6. This connection allows the second pressure regulator 4 by means of the changeover valves 7, 6 to pressurize the first clutch 8 with controlled pressure. If the connection according to arrow 14 is established, the second clutch is depressurized substantially to a pressure of zero. In this state, the second clutch 10 is separated both from the first pressure regulator 3 as well as from the second pressure regulator 4.

Figure 2:
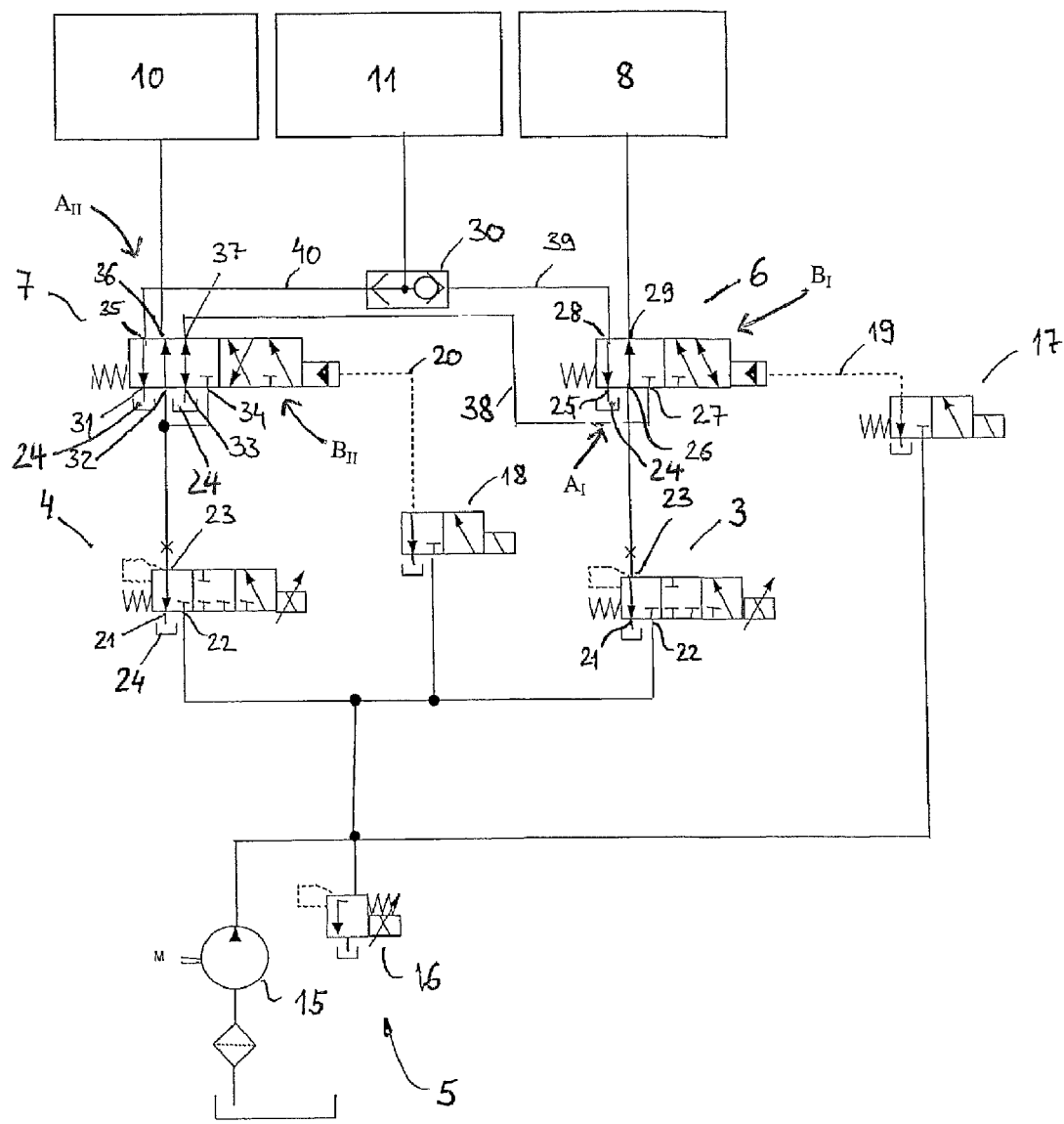
FIG. 2 shows a block circuit diagram of the preferred embodiment shown in FIG. 1.

FIG. 2 shows a block diagram of a preferred embodiment realizing the embodiment shown in FIG. 1. The pump 15 in connection with a main pressure regulator 16 embodies substantially the oil pressure source 5.

For actuating the first changeover valve 6 and the second changeover valve 7 the first signal element 17 and the second signal element 18, respectively, are provided. The first signal element 17 directs by means of a signal line 19 a signal or a signal pressure to the first changeover valve 6. By means of this signal the changeover valve 6 can be actuated. The second changeover valve 7 is shifted by means of a signal or a signal pressure that is generated by the second signal element 18 and conducted via a signal line 20.

The pressure regulators 3, 4 are both designed as 3/3-way valves with input ports 21, 22 and an output port 23. The input port 21 is connected to an oil sump 24 and the input port 22 is connected with the oil pressure source 5. The output port 23 of each one of the pressure regulators 3, 4 is guided to the respective changeover valves 6, 7.

The first changeover valve 6 is designed as a 5/2-way valve. The 5/2-way valve 6 comprises three input ports 25, 26, 27 and two output ports 28, 29. The input port 25 is connected with the oil sump 24, while the input port 26 is connected to the output port 23 of the first pressure regulator 3. It is referred to the input port 27 further down.

The output port 28 is connected via a line 39 to the switch 30 that is connected with the shifting system 11. The output port 29 is directed to the first clutch 8.

The second changeover valve 7 is designed as a 7/2-way valve with input ports 31, 32, 33, 34 and three output ports 35, 36, 37. The input ports 31, 33 are connected to the oil sump 24, while the input ports 32, 34 are connected with the output port 23 of the second pressure regulator 4. The output port 35 is connected to the switch 30 by means of a line 40, while the output port 36 is directed to the second clutch 10. By means of a connecting line 38 the output port 37 of the second pressure regulator 4 is connected to the first pressure regulator input port 27 that has already been mentioned above.

In its electrically excited state, the first signal element 17, here designed as a 3/2-way control valve and provided upstream of the first changeover valve 6, shifts in such a manner that pressure from the oil pressure source 5 can pass through to the changeover valve 7, wherein the changeover valve 6 is shifted from its spring loaded resting position, namely a first position $A_I$ as shown in FIG. 2, into a second position $B_I$. As well as the first signal element 17, also the second signal element 18 that is connected upstream to the changeover valve 7 is designed as a 3/2-way control valve. The changeover valve 7 assumes in its resting position as the first position $A_{II}$ and in case of receiving a signal or control pressure assumes the second position $B_{II}$.

In a first position $A_I$ (as shown in FIG. 2) the first changeover valve 6 provides a connection between the first pressure regulator 3 and the first clutch 8. Also the second changeover valve 7 assumes the first position $A_{II}$ in which the second clutch 10 and the second pressure regulator 4 are connected to each other. In these positions $A_I$ and $A_{II}$ the two clutches 8 and 10 are pressurized by the respective controlled pressure, so that both clutches can for a particular overlapping transitional phase in accordance with the controlled pressures from the pressure regulators 3, 4 simultaneously transmit a torque.

If for instance the first signal element 17 is actuated electrically, the signal or control pressure is directed via the signal line 19 to the first changeover valve 6, pressing it against the spring force into the second position $B_I$. In this second position $B_I$ the first clutch 8 is separated from the pressure regulator 3 and the pressurizing medium (oil) is pressurized by a clutch cylinder belonging to the clutch 8 and is fed via the outlet port 29 and the inlet port 27 of the first changeover valve 6 through the connecting line 38 to the outlet port 37. If the second changeover valve 7 assumes the first position $A_{II}$ (as shown in FIG. 2) the connection between the outlet port 37 and the inlet port 33 or the oil sump 24 is established. This causes reducing of the pressure in the clutch cylinder and opening of the clutch 8. Furthermore, when in the position $B_I$ of the first changeover valve 6 the inlet port 26 is connected with the outlet port 28, so that controlled pressure from the first pressure regulator 3 is guided to the switch 30, and when the switch 30 switches the pressure through, the pressure also pressurizes the shifting system 11 for engaging and disengaging gears. If the second changeover valve is not in its first position $A_{II}$, in contrast to what is shown in FIG. 2 and assumed in the preceding paragraph, but instead assumes the position $B_{II}$, the first clutch 8 is connected to the second pressure regulator 4, while simultaneously the second clutch 10 is connected to the oil sump 24.

In the following, the preferable shifting action is described that is conducted when the pressure regulator 3, or in the alternative when the pressure regulator 4 fails.

If for instance the pressure regulator 3 fails in its closed position as shown in FIG. 2, the clutch 8 is activated by the second pressure regulator 4, wherein the first changeover valve 6 is in its second position $B_I$ and the second changeover valve 7 is in its second position $B_{II}$. Therefore, a connection is established between the second pressure regulator 4 via the connecting line 38 and the first clutch 8. This allows an emergency running mode of the dual clutch transmission in the gears of a first partial transmission, preferably including a first forward gear and a reverse gear.

The gears of the first partial transmission can be engaged or disengaged by the second pressure regulator 4. For engaging or disengaging the gears of the first partial transmission, the first changeover valve 6 is shifted to its position $A_I$, so that the first clutch 8 is connected with the first pressure regulator 3 that failed, wherein the latter assumes its open position so that the first clutch 8 is opened.

In the second position B$_I$ of the first changeover valve 6 the switch 30 is connected via the outlet port 28 and the inlet port 26 with the failed first pressure regulator 3 in its open position. Pursuant to the pressure conditions to which the switch 30 is then subjected, a connection between the second pressure regulator 4 and the shifting system 11 is established, wherein the controlled pressure allows to engage the gears of the first partial transmission.

If, however, the first pressure regulator 3 fails in its open position, engaging and disengaging of the gears of the first partial transmission is not effected via the second pressure regulator 4 but by means of the pressure at the main pressure regulator 16 of the oil pressure source 5. In this case, the main pressure regulator 16 cooperates via the open pressure regulator 3 and the first changeover valve 6 in its second position B$_I$ with the switch 30. As a result, the switch 30 establishes a connection to the shifting system 11 caused by the pressure difference between the line 39 and the line 40. During the engagement and disengagement of the gears of the first partial transmission, the controlled pressure at the outlet port 23 of the second pressure regulator 4 and therefore also in the line 40 is very low, since otherwise the first clutch 8 would not be open. Therefore, a pressure difference between the line 39 and the line 40 establishes, causing the switch 32 to switch into a connection between the first changeover valve 6 and the shifting system 11.

If a gear in the second partial transmission is still engaged before the dual clutch transmission is operated in the emergency running mode only via the first clutch 8, such a gear is disengaged since the pressure required for disengaging said gear is provided by the second pressure regulator 4 if the first pressure regulator 3 failed in its closed position. If the first pressure regulator fails in its open position, disengaging of the gear is effected by the main pressure regulator 16.

If the second pressure regulator 4 fails, the second changeover valve 7 is shifted to its first position A$_{II}$ so that the second pressure regulator 4 is separated both from the shifting system 11 as well as from the first clutch 8. By means of the first pressure regulator 3 the gears of the first partial transmission can be engaged or disengaged and the first clutch 8 can be actuated so that an emergency running mode of the dual clutch transmission can be established by means of the first clutch and the related gears of the first partial transmission.

If the second pressure regulator 4 has failed in its open position (as shown in FIG. 2), the second clutch is connected by means of the second changeover valve 7 in its second position with the oil sump 24 and therefore is completely depressurized. Therefore, no torque can be transmitted between the driving unit and the second partial transmission. A gear in the second partial transmission that might be engaged does not necessarily have to be disengaged for establishing the emergency running mode of the dual clutch transmission. However, it has to be observed that the driving speed is restricted to an appropriate speed for avoiding any overburden on the engaged gear of the second partial transmission.

In the alternative, an engaged gear of the second partial transmission can be disengaged by the first pressure regulator 3. Disengagement via the first pressure regulator 3 is, however, only possible, if the second pressure regulator 4 has failed in its closed position. If, to the contrary, the second pressure regulator has failed in its open position, the respective gear in the second partial transmission is disengaged by the main pressure regulator 16.

List of reference numerals

| | |
|---|---|
| 1 | control apparatus |
| 2 | control unit |
| 3 | first pressure regulator |
| 4 | second pressure regulator |
| 5 | oil pressure source |
| 6 | first changeover valve |
| 7 | second changeover valve |
| 8 | first clutch |
| 9 | group selector |
| 10 | second clutch |
| 11 | shifting system |
| 12 | first group of actuators |
| 13 | second group of actuators |
| 14 | arrow |
| 15 | pump |
| 16 | main pressure regulator |
| 17 | first signal element |
| 18 | second signal element |
| 19 | signal line |
| 20 | signal line |
| 21 | input port |
| 21 | input port |
| 22 | input port |
| 23 | output port |
| 24 | oil sump |
| 25 | input port |
| 26 | input port |
| 27 | input port |
| 28 | output port |
| 29 | output port |
| 30 | switch |
| 31 | input port |
| 32 | input port |
| 33 | input port |
| 34 | input port |
| 35 | output port |
| 36 | output port |
| 37 | output port |
| 38 | connecting line |
| 39 | line |
| 40 | line |
| A$_I$ | first position of the first pressure regulator |
| B$_I$ | second position of the first pressure regulator |
| A$_{II}$ | first position of the second pressure regulator |
| B$_{II}$ | second position of the second pressure regulator |

The invention claimed is:

1. A hydraulic control apparatus for an automatic dual clutch transmission, comprising:
   a first clutch with a first partial transmission and a second clutch with a second partial transmission, as well as a shifting system for engaging/disengaging gears of the two partial transmissions,
   a control unit that controls at least one of the parameters controllable pressure and controllable volumetric flow for the actuation of the first and second clutches and for the actuation of the shifting system,
   a switching apparatus that is arranged between the control unit and the clutches or the shifting system and can be used to switch the at least one of the parameters controllable pressure and controllable volumetric flow between the clutches or the shifting system, the control unit having a first pressure regulator and a second pressure regulator, wherein the shifting apparatus comprises:
   a first changeover valve that
   a) in a first position (A$_I$) connects the first pressure regulator to the first clutch and disconnects the first pressure regulator from the shifting system, and
   b) in a second position (B$_I$) connects the first pressure regulator to the shifting system and disconnects the first pressure regulator from the first clutch; and
   a second changeover valve that c) in a first position ($A_{II}$) connects the second pressure regulator to the second clutch and disconnects second pressure regulator from the shifting system, and d) in a second position ($B_{II}$) connects the second pressure regulator to the shifting system and disconnects second pressure regulator from the second clutch, wherein in the second position ($B_I$) of the first changeover valve and in the second position ($B_{II}$) of the second changeover valve a connection is established between the second changeover valve and the first clutch while the second clutch is substantially completely depressurized.

2. The control apparatus as claimed in claim 1, wherein the first partial transmission comprises the first forward gear and one reverse gear.

3. The control apparatus as claimed in claim 1, wherein a switching means is provided between the first changeover valve and the shifting system and between the second changeover valve and the switching system, which switching means ensures that the shifting system is subjected to either the pressure/volumetric flow from the first pressure regulator or the pressure/volumetric flow from the second pressure regulator.

4. The control apparatus as claimed in claim 3, wherein the switching means is designed as an alternating check valve.

5. The control apparatus as claimed in claim 1, wherein a group selector is provided by means of which the control unit is connected either to a first group of actuators belonging to the first partial transmission or to a second group of actuators belonging to the second partial transmission.

6. A method for controlling a dual clutch transmission using a hydraulic control apparatus for an automatic dual clutch transmission, including the method steps:

providing a first clutch with a first partial transmission and a second clutch with a second partial transmission, as well as a shifting system for engaging/disengaging gears of the two partial transmissions providing a control unit;

controlling by means of said control unit at least one of the parameters of controllable pressure and controllable volumetric flow for the actuation of the first and second clutches and for the actuation of the shifting system, and providing a switching apparatus that is arranged between the control unit and the clutches or the shifting system and can be used to switch the controllable pressure or the controllable volumetric flow between the clutches or the shifting system, the control unit having a first pressure regulator and a second pressure regulator, and the switching apparatus having a first changeover valve and a second changeover valve, operating the first changeover valve in such a manner that the first changeover valve a) in a first position ($A_I$) connects the first pressure regulator to the first clutch and disconnects the first pressure regulator from the shifting system, and b) in a second position ($B_I$) connects the first pressure regulator to the shifting system and disconnects the first pressure regulator from the first clutch; and operating the second changeover valve in such a manner that the second changeover valve c) in a first position ($A_{II}$) connects the second pressure regulator to the second clutch and disconnects the second pressure regulator from the shifting system, and d) in a second position ($B_{II}$) connects the second pressure regulator to the shifting system and disconnects the second pressure regulator from the second clutch, shifting in case of failure of the first pressure regulator the first changeover valve to its second position ($B_I$) and the second changeover valve to its second position ($B_{II}$).

7. The method as claimed in claim 6, including the method steps of:

engaging and disengaging the gears of the first partial transmission in case of a failure of the first pressure regulator in a closed position of the said first pressure regulator by means of the second pressure regulator; and engaging and disengaging the gears of the first partial transmission in case of a failure of the first pressure regulator in an open position of the said first pressure regulator by means of a main pressure regulator of an oil pressure source.

8. The method as claimed in claim 6, including the method steps of:

engaging and disengaging the gears of the second partial transmission in case of a failure of the first pressure regulator in a closed position of the said first pressure regulator by means of the second pressure regulator; and engaging and disengaging the gears of the second partial transmission in case of a failure of the first pressure regulator in an open position of the said first pressure regulator by means of a main pressure regulator of an oil pressure source.

9. The method as claimed in claim 6, including the method step of switching the second changeover valve to its first position ($A_{II}$) or keeping it in said first position in case of a failure of the second pressure regulator.

10. The method as claimed in claim 9, including the method steps of:

at first attempting to disengage an engaged gear of the second partial transmission by switching the second changeover valve into its second position ($B_{II}$);

second, in case of a failure of the second pressure regulator in its closed position, disengaging the engage gear in the second partial transmission by means of the first pressure regulator; or in the alternative in case of a failure of the second pressure regulator in its open position by means of the main pressure regulator.

* * * * *